Patented Sept. 30, 1930

1,776,802

UNITED STATES PATENT OFFICE

JAMES BADDILEY, RAINALD BRIGHTMAN, AND PERCY CHORLEY, OF BLACKLEY, MANCHESTER, ENGLAND, ASSIGNORS TO BRITISH DYESTUFFS CORPORATION LIMITED, OF BLACKLEY, MANCHESTER, ENGLAND

PROCESS FOR DYEING

No Drawing. Application filed June 4, 1928, Serial No. 282,882, and in Great Britain June 7, 1927.

According to our co-pending application Serial No. 271,399 new disazo dyestuffs are obtained by combining 2-nitro and 2:2'-dinitrobenzidine with one molecule of an amino-naphthol sulphonic acid or an N-substituted derivative thereof and one molecule of any of the usual coupling components. Many of the dyestuffs thus obtained possess the valuable property of dyeing a regenerated cellulose such as viscose silk, in even shades. In further development of this discovery, we have now found that many of the disazo dyes obtained by combining the tetrazo compounds of other 2:2'-substituted derivatives of 4:4'-diaminodiphenyl with two molecules of the same or different coupling components also possess the valuable property of giving even dyeings on regenerated cellulose silks. The present application is a continuation in part of our above recited copending application Serial No. 271,399.

The present invention relates to the dyeing in even, level shades of regenerated cellulose materials, for example, viscose silks, by applying to the said regenerated cellulose materials the disazo dyestuffs obtained by combining the tetrazo derivative of a 2:2'-substituted 4:4'-diaminodiphenyl with two molecules of the same or different coupling components. The said disazo dyestuffs may be represented by the following general formula

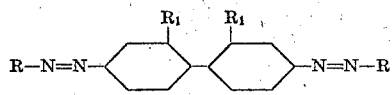

where R represents the residue of the coupling component and $R_1$ represents a substituent atom or group, and when sulphonic groups are present, there must not be more than two such groups contained in the disazo dyestuffs. For the production of satisfactory results, we have found that there must not be present in the dyestuff molecule more than two sulphonic acid groups, which groups may occupy the 2:2'-positions in the diphenyl nucleus or may be contained in one or in both of the coupling components applied. The choice of coupling components is accordingly determined by the nature of the 2:2'-substituents in the diphenyl nucleus. Some of the dyestuffs of the aforementioned type are already known (see, for instance, British specifications No. 10,331 of the 27th April, 1910, Bloxam, and No. 28,678 of the 9th December, 1910, Bloxam) and have found application in the dyeing of wool, particularly for the production on wool of dyeings which are fast to milling. They possess, however, only a poor affinity for cotton and have therefore no value for dyeing the cotton fibre. It was not to be foreseen that these dyestuffs would have a good affinity for regenerated cellulose silk, such as viscose silk, and in particular that they would possess the valuable property of dyeing viscose silk in even shades.

It is well known that the artificial silks made from regenerated cellulose give great difficulty in dyeing, owing to the fact that the fabric generally possesses an uneven affinity for the usual types of substantive cotton colours, in consequence of which the dyeings obtained are unlevel. Our invention is therefore of great value in the art of dyeing silks of this type.

The following examples illustrate the invention, but we do not limit ourselves to the conditions described therein. The parts are by weight.

Example 1

The goods to be dyed (100 parts) are entered cold into 5,000 parts of water containing 3 parts of soap and 1 part of the dyestuff obtained by tetrazotizing 253 parts of 2:2'-dichloro-4:4'-diaminodiphenyl and combining with 138 parts of salicylic acid and 239 parts of 2-amino-8-naphthol-6-sulphonic acid in alkaline solution. The dye bath is brought to the boil and maintained at or near that temperature for ¾ hour, about 15 parts of Glauber's salt being added before the finish. The silk is then removed from the bath, rinsed and dried. It is dyed a very even orange-brown shade.

Example 2

If instead of the dyestuff used in the above example there is used 1 part of the dyestuff formed by combining one molecule of 2:2'-dimethylbenzidine (m-tolidine) with one molecule of salicylic acid and one molecule of 2-amino-8-naphthol-6-sulphonic acid in alkaline solution the viscose silk is dyed an even maroon shade.

The following table illustrates the shades we obtain but the invention is not limited to the examples contained therein; the couplings with pyrazolone derivatives are performed in acid solution; all other couplings mentioned in the table are carried out in the presence of alkali.

| 2:2'-benzidine derivative tetrazotized | Combined with (1) | (2) | Shade on viscose silk |
|---|---|---|---|
| 2:2'-dichloro-benzidine | Salicylic acid | 2-phenylamino-8-naphthol-6-sulphonic acid | Yellowish-brown |
| do | Beta-oxynaphthoic acid | 2-amino-8-naphthol-6-sulphonic acid | Claret |
| do | 2-amino-8-naphthol-6-sulphonic acid | 2-amino-8-naphthol-6-sulphonic acid | Maroon |
| do | do | Resorcinol | Orange-brown |
| do | 1-(2':5'-dichloro-4'-sulphophenyl)-3-methyl-5-pyrazolone | 2-amino-5-naphthol-7-sulphonic acid | Orange-red |
| do | 1-(4'-sulphophenyl-)-3-methyl-5-pyrazolone | 2-amino-8-naphthol-6-sulphonic acid | Light-brown |
| do | Salicylic acid | 1-phenylamino-8-naphthalene-sulphonic acid | Yellowish-red |
| do | do | 1-amino-8-naphthol-4-sulphonic acid | Claret |
| 2:2'-dimethyl benzidine (m-tolidine) | do | 2-amino-8-naphthol-6-sulphonic acid (coupled in acid solution) | Red |
| do | do | 2-phenylamino-8-naphthol-6-sulphonic acid (coupled in alkaline solution) | Brown |
| do | 2-amino-8-naphthol-6-sulphonic acid | 2-amino-8-naphthol-6-sulphonic acid | Reddish-brown |
| do | Beta-naphthol | 1-amino-8-naphthol-2:4-disulphonic acid | Reddish-violet |
| Benzidine-2:2'-dicarboxylic acid | Salicylic acid | 2-phenylamino-8-naphthol-6-sulphonic acid | Brown |
| do | 1-phenyl-3-methyl-5-pyrazolone | 1-phenyl-3-methyl-5-pyrazolone | Yellow |
| do | 2-phenylamino-5-naphthol-7-sulphonic acid | Resorcinol | Crimson |
| do | 1-(4'-sulphophenyl)-3-methyl-5-pyrazolone | Beta-naphthol | Orange |
| Benzidine-2:2'-disulphonic acid | 1-phenyl-3-methyl-5-pyrazolone | 1-phenyl-3-methyl-5-pyrazolone | Yellow |
| 2:2'-dinitrobenzidine | Salicylic acid | 2-amino-8-naphthol-6-sulphonic acid | Yellowish-brown |

A generic formula which can be used to represent the dyes of Examples 1 and 2 is as follows:

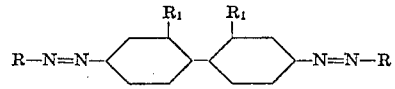

wherein R represents the coupled residue of salicylic acid, $R_2$ represents the coupled residue of 2-amino-8-naphthol-6-sulphonic acid and $R_1$ represents Cl or $CH_3$.

What we claim and desire to secure by Letters Patent is:—

1. The process for dyeing regenerated cellulose materials in level shades which consists in applying to the said regenerated cellulose materials a disazo dye obtained by coupling tetrazotized 2:2'-substituted 4:4'-diaminodiphenyls with one molecular proportion of one component and one molecular proportion of a different component, the said disazo dye containing not more than two sulphonic groups.

2. The regenerated cellulose materials dyed with disazo dyes, the said dyes comprising the coupled residues of 2:2' substituted 4:4' diaminodiphenyls and of molecular proportions of coupling components, and containing not more than two sulphonic groups.

3. The process for dyeing regenerated cellulose materials in even level shades, which comprises applying to the said regenerated cellulose materials a disazo dye having the following general formula

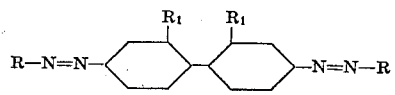

wherein R represents a coupling component and $R_1$ represents a substituent atom or group, the said disazo dye containing two or less sulphonic groups.

4. The process for dyeing regenerated cellulose materials in even level shades, which comprises applying to the said regenerated cellulose materials a disazo dye having the following general formula

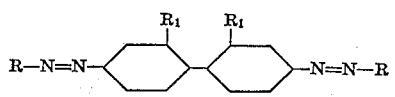

where R represents a coupling component and $R_1$ represents $NO_2$, alkyl, Cl, $SO_3H$, or COOH groups, the said disazo dye containing two or less sulphonic groups.

5. The process for dyeing regenerated cellulose materials in even level shades, which comprises applying to the said regenerated cellulose materials a disazo dye having the following general formula where R represents a coupling component, at least one coupling component being an aminonaphthol sulphonic acid and $R_1$ represents alkyl, Cl, $SO_3H$, or COOH groups, the said disazo dye containing two or less sulphonic groups.

6. The regenerated cellulose materials dyed with disazo dyes, the said dyes comprising the coupled residues of 2:2' substituted 4:4' diaminodiphenyls and of molecular proportions of two different coupling components, and containing not more than two sulphonic groups.

7. The regenerated cellulose materials dyed with a disazo dye having the following general formula

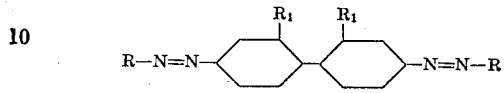

where R represents a coupling component and $R_1$ represents a substituent atom or group, the said regenerated dyed cellulose materials having even level shades.

8. The regenerated cellulose materials dyed with a disazo dye having the following general formula

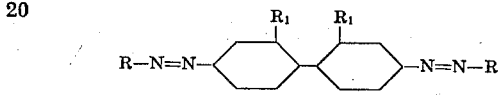

where R represents a coupling component and $R_1$ represents $NO_2$, alkyl, Cl, $SO_3H$, or COOH groups, the said regenerated dyed cellulose materials having even level shades.

9. The regenerated cellulose materials dyed with a disazo dye having the following general formula

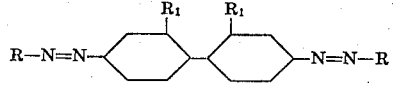

where R represents a coupling component, at least one coupling component being an aminonaphthol sulphonic acid and $R_1$ represents $NO_2$, alkyl, Cl, $SO_3H$, or COOH groups, the said regenerated dyed cellulose materials having even level shades.

10. The process of dyeing regenerated cellulose materials in level shades which comprises applying to the said regenerated cellulose materials a disazo dye obtained by coupling tetrazotized 2:2'-substituted 4:4'-diaminodiphenyls with molecular proportions of coupling components, the said disazo dye containing not more than two sulphonic groups.

11. In the dyeing of regenerated cellulose materials, the process which comprises applying to the said regenerated materials a disazo dye having the following general formula

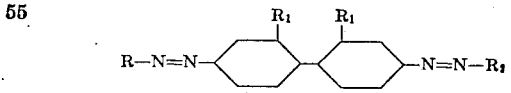

wherein R represents the coupled residue of salicylic acid, $R_2$ represents the coupled residue of 2-amino-8-naphthol-6-sulphonic acid and $R_1$ represents Cl or $CH_3$.

12. In the dyeing of regenerated cellulose materials, the process which comprises applying to the said regenerated materials a disazo dye having the following general formula

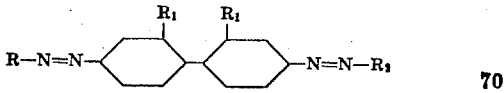

wherein R represents the coupled residue of salicylic acid, $R_2$ represents the coupled residue of 2-amino-8-naphthol-6-sulphonic acid and $R_1$ represents a chlorine atom.

13. The regenerated cellulose materials dyed with a disazo dye having the following general formula

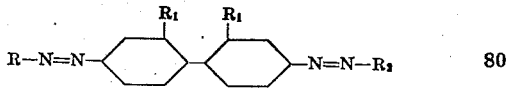

wherein R represents the coupled residue of salicylic acid, $R_2$ represents the coupled residue of 2-amino-8-naphthol-6-sulphonic acid and $R_1$ represents Cl or $CH_3$, the said regenerated dyed cellulose materials having even level shades.

14. The regenerated cellulose materials dyed with a disazo dye having the following general formula

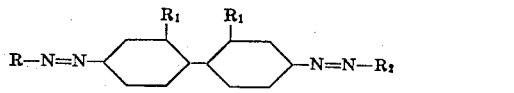

wherein R represents the coupled residue of salicylic acid, $R_2$ represents the coupled residue of 2-amino-8-naphthol-6-sulphonic acid and $R_1$ represents a chlorine atom, the said regenerated dyed cellulose materials having even level shades.

In testimony whereof we affix our signatures.

JAMES BADDILEY.
PERCY CHORLEY.
RAINALD BRIGHTMAN.